Oct. 11, 1966

TSUGUO KOMINAMI 3,278,505

PROCESS FOR PRODUCING POLYVINYL ACETATE POLYMERS

Original Filed Dec. 29, 1959

INVENTOR.
TSUGUO KOMINAMI
BY
William C. Long
ATTORNEY

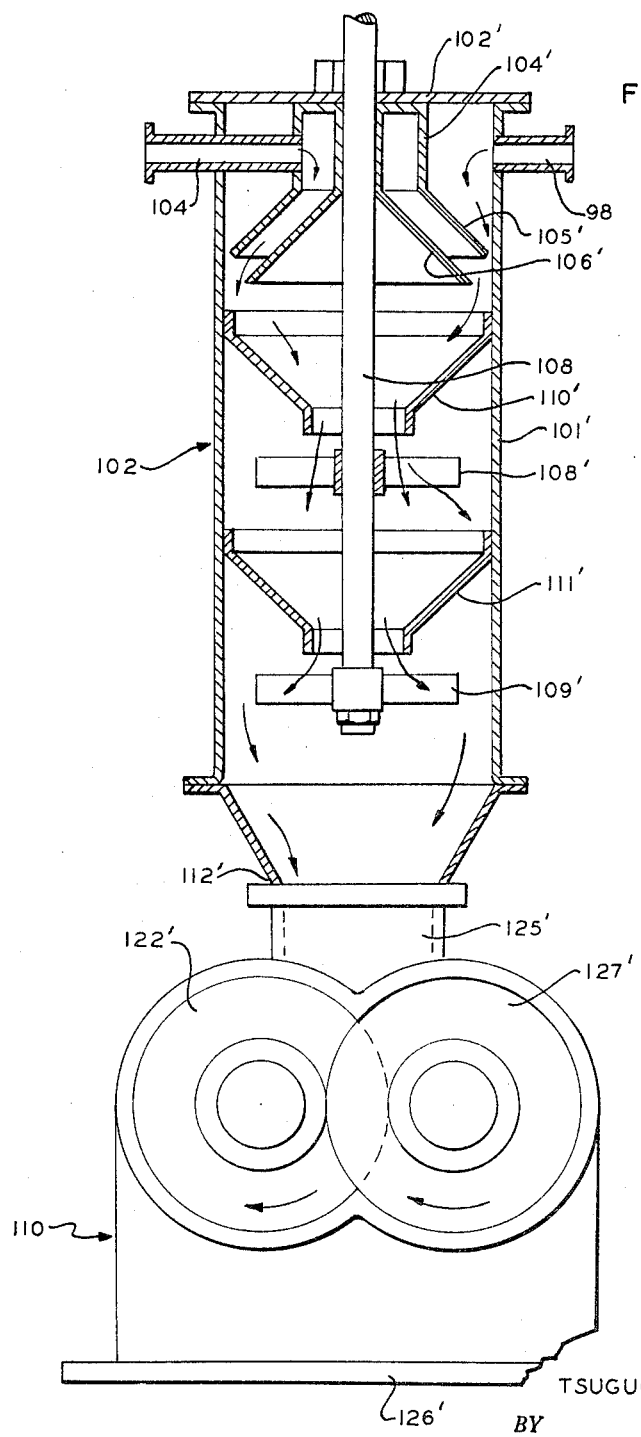

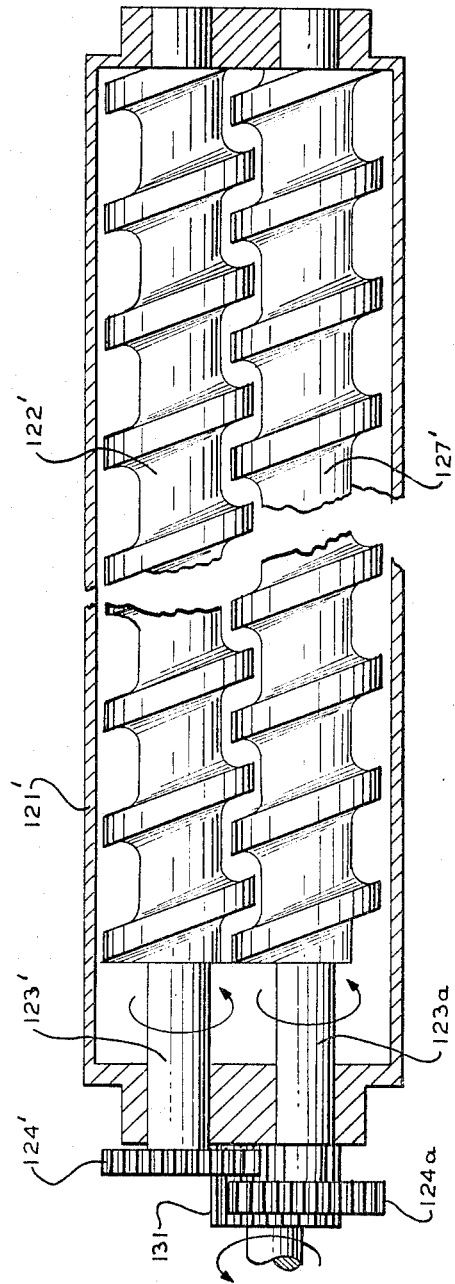

United States Patent Office 3,278,505
Patented Oct. 11, 1966

3,278,505
PROCESS FOR PRODUCING POLYVINYL
ACETATE POLYMERS
Tsuguo Kominami, Nishinomiya, Japan, assignor to Kurashiki Rayon Co., Ltd., Kurashiki-shi, Japan, a corporation of Japan
Continuation of application Ser. No. 862,626, Dec. 29, 1959. This application Oct. 7, 1963, Ser. No. 315,738
9 Claims. (Cl. 260—89.1)

This invention relates to the manufacture of polyvinyl alcohol and is more particularly concerned with a process for producing polyvinyl alcohol of a predetermined viscosity and having advantageous characteristics.

Polyvinyl alcohol has been produced in the past by the hydrolysis or "saponification" of a polyvinyl ester, more particularly polyvinyl acetate, which in turn has been suitably produced by the polymerization of the appropriate vinyl ester monomer, e.g. vinyl acetate.

Difficulty has been experienced, however, in obtaining a polyvinyl alcohol of desired characteristics. In particular it has been difficult to produce continuously a polyvinyl alcohol of a predetermined viscosity, and it has been difficult to achieve a high percentage of saponification, i.e. a low percentage of acetyl groups in the polyvinyl alcohol molecule. A particular problem has been encountered when it has been desired to produce a polyvinyl alcohol adapted to be used to form fibers. An important use for polyvinyl alcohol is in the formation of fibers which are suitably used to make threads, fabrics and the like. Polyvinyl alcohol heretofore produced has, in some cases, been generally unsuitable for the formation of fibers because of unreliable and varying characteristics and incomplete saponification. It has also been difficult to realize desired viscosities directly without special treatment of the finished polyvinyl alcohol.

It is an object of the present invention to provide an improved process for the production of polyvinyl alcohol from monomeric vinyl acetate.

It is another object of the invention to provide a process of the character indicated which makes it possible for the viscosity of the product polyvinyl alcohol to be controlled to a predetermined value.

It is a further object of the invention to provide a process of making polyvinyl alcohol which may be employed to produce a high-quality product suitable for the formation of fibers.

It is a still further object of the invention to provide a process for producing polyvinyl alcohol of high quality and purity.

In accordance with the present invention, monomeric vinyl acetate is polymerized advantageously in solution in methanol, in the presence of a catalyst at substantially the boiling point of the polymerization solution to a degree of polymerization within a predetermined range and with a predetermined conversion of the monomer to polymer. Polymerization is effected in stages in a plurality of polymerization zones and the polymerization mixture is diluted with further quantities of methanol after removal from the last polymerization zone. Unreacted vinyl acetate is removed by fractional distillation in a manner which minimizes further polymerization of the vinyl acetate and produces a solution of polyvinyl acetate in methanol substantially free from vinyl acetate and catalyst. The thus recovered polyvinyl acetate is then saponified, by means of an aqueous alkaline catalyst, to produce a polyvinyl alcohol slurry which is filtered and washed to separate the polyvinyl alcohol, and the polyvinyl alcohol is then dried to produce a product having desired characteristics, including predetermined viscosity, and wherein saponification is substantially complete and there is a minimum content of acetate radicals in the molecule.

It is a feature of the invention that a series of integrated steps are provided which make possible controlled production of a final product of predetermined valuable and desirable characteristics.

It is another feature of the invention that high-grade polyvinyl alcohol suitable for making fibers can be directly produced by the process provided without additional treatment.

It is a further feature of the invention that a polyvinyl alcohol may be produced which is essentially free from acetate groups and thus exhibits substantially 100% saponification.

Other objects and features of the invention will be apparent from the following detailed description of illustrative embodiments of the invention and from the accompanying drawings.

In accordance with the invention, vinyl acetate, methanol when used, and a polymerization catalyst are mixed and heated to approximately the boiling point of the mixture and the preheated mixture is then refluxed in two polymerization zones connected in series with a portion of the polymerization being effected in the first zone and the remainder, up to about 80% conversion depending upon the viscosity desired, being effected in the other zone. The polymerized mixture is then passed through a distillation or stripping zone wherein it is heated with vapors of methanol, and preferably in the presence of water, and a concentrated solution of polyvinyl acetate in methanol substantially free from monomeric vinyl acetate and catalyst is obtained as non-distilled product. This solution, suitably further diluted and combined with a saponification catalyst, is then saponified in blending and saponification zones to produce a highly saponified product which, when substantially complete saponification is desired, still contains free catalyst. This product is then sub-divided and slurried and passed to a filter where it is filtered and washed under conditions which, when substantially complete saponification is desired, are selected to leave free catalyst and, preferably, water in the filter cake. The filter cake is sub-divided and sent to a drying zone wherein it is dried, i.e. freed from associated liquid, while final saponification is simultaneously substantially completely effected. The resultant product is characterized by high uniformity, and a high degree of polymerization, with a viscosity closely related to the viscosity of the polyvinyl acetate produced in the polymerization zones.

The process of the present invention will now be more fully described and will be better understood by reference to the accompanying drawings which show, somewhat diagrammatically, a typical system in which the above described process may be effectively carried out, it being understood that the system illustrated is given merely by way of example to facilitate an understanding of the invention and that the process of this invention is not limited by the apparatus or apparatus relationships shown.

In the drawings,

FIG. 3 is a vertical sectional view, partly in elevation, of a combined mixing and saponifying device; and FIG. 4 is a top elevational view of the saponifying component of the device shown in FIG. 3, with the upper portion cut away to show details of construction.

Figure 1:
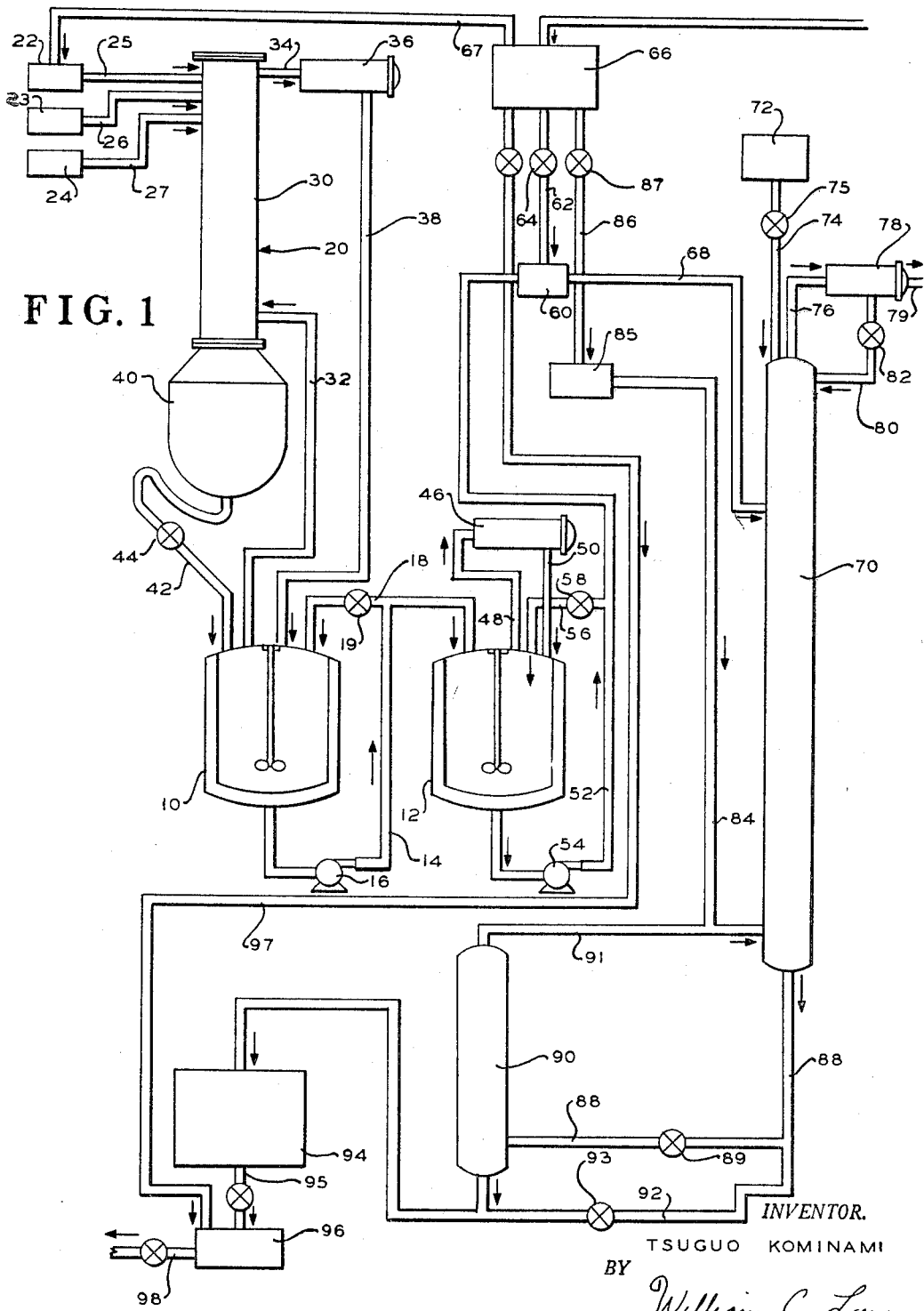
FIG. 1 is a diagrammatic view, in the nature of a flow sheet, showing the flow of materials in the preparation of a solution of polyvinyl acetate.

In the polymerization operation, wherein polymerization is carried out in series in a primary polymerization zone and in a secondary polymerization zone, the components of the polymerization mixture, i.e., the vinyl acetate monomer, the methanol, and the catalyst are first premixed and heated in a preheating zone in an inert atmosphere, e.g. a nitrogen atmosphere, wherein heat is suitably supplied from the vapors issuing from the primary polymerization zone. The polymerization components are advantageously introduced into the upper portion of the preheating zone and pass downwardly in direct countercurrent heat exchange with the vapors issuing from the primary polymerization zone. The heated components accumulate at the bottom of the preheating zone and are gradually fed to the primary polymerization zone. By reason of the preheating of the polymerization components, which suitably raises their temperature to about 58–60° C., the normal induction period which is generally observed in the polymerization of vinyl acetate is overcome and polymerization is initiated. Thus, when the polymerization mixture is then introduced into the primary polymerization zone, polymerization has already begun and can be continued to the desired value under close control without the disturbing influence of the induction period. In the primary zone, wherein polymerization is carried out at the refluxing temperature of the mixtures, i.e. at about 60° C., polymerization is continued until conversion of vinyl acetate to polymer of about 15–25% has been achieved. In accordance with customary usage, the term "conversion" as used herein means the extent to which monomer has been converted to polymer, i.e. the percent polymer which can be isolated at the stage of polymerization in question. The partially polymerized reaction mixture is then withdrawn from the primary polymerization zone and is transferred to the secondary polymerization zone which, as previously indicated, is connected in series with the primary polymerization zone. Again polymerization is continued at the refluxing temperature of the mixture and polymerization is continued until a conversion of about 30–80% has been achieved. The polymerized mass is then withdrawn from the secondary polymerization zone and is further processed, as will be described below. Generally speaking, substantially half of the final conversion desired is carried out in the primary polymerization zone. Thus, when 15% conversion is carried out in the first zone, the final product leaving the secondary zone suitably has a 30% conversion and when 25% conversion is carried out in the primary zone, the final product advantageously corresponds to 50% conversion. In any case, a total of 50% conversion is usually not exceeded except in the case of low-viscosity polymer, in the making of which total conversion may rise to 70–80%.

In carrying out polymerization, a portion of the effluent from each polymerization zone is recycled to the zone from which it is withdrawn. Thus, a portion of the partially-polymerized mass withdrawn from the primary zone is returned to the primary zone and the remainder is passed to the secondary zone. Similarly, a portion of the polymerized mass withdrawn from the secondary polymerization zone is returned to the secondary zone for remixing with the mixture undergoing polymerization. The ratio of recycling of effluent may vary, but advantageously the ratio of recycled material to material transferred to the next operating step is between 2:1 and 4:1, preferably 3:1.

The catalyst employed may be any of the numerous catalysts which have been found effective in polymerizing vinyl acetate, but preferred classes of catalysts are peroxides, such as benzoyl peroxide and acetyl peroxide, and azo compounds, such as the symmetrical azonitriles of the type described in U.S. Patent 2,471,959, particularly alpha,alpha' - azobisisobutyronitrile. The relative proportions of the methanol to vinyl acetate and of the catalyst to vinyl acetate will vary depending upon the viscosity of the polymer desired. Increased quantities of catalyst and methanol in relation to vinyl acetate and polymerization to a high percent conversion, e.g. 70–80%, lead to lower viscosity polymer, whereas decreased quantities of catalyst and solvent and lower percent conversions lead to increased polymer viscosities. As a result, the viscosity of the polymer can be directly controlled by suitable control of the quantity of catalyst and solvent in relation to vinyl acetate polymerized and the percent conversion effected. It has also been found that when operating in accordance with the process of this invention the viscosity of the polyvinyl alcohol obtained as a final product of the integrated process of the present invention is directly related to the viscosity of the polyvinyl acetate produced in the polymerization reaction which is obtained primarily as a linear polymer with minimum formation of branched side chains. It is therefore possible to predetermine the viscosity of the final product in the polymerization step of the process. The quantity of methanol, in weight percent based on a unit weight of vinyl acetate, may vary from 0 to 125% and the quantity of catalyst may vary from .005% to 1.0%. Furthermore, different catalysts are effective in different quantities, as is well-known in the art. Generally, four times as much of a peroxide catalyst is required as compared with the quantity of an azo catalyst, such as alpha,alpha'-azobisisobutyronitrile. As a general rule, to make high viscosity polymer 0 to 15 parts, preferably 1 to 15 parts, by weight of methanol and .005 to 0.1 part by weight of catalyst are used per 100 parts of vinyl acetate, to make medium viscosity polymer 20 to 35 parts of methanol and 0.04 to 0.35 part of catalyst per 100 parts of vinyl acetate are used, and to make low viscosity polymer 0.2 to 1 part of catalyst and 75 to 125 parts of methanol per 100 parts of vinyl acetate are suitably employed.

In the foregoing, "high viscosity" means a viscosity of above 50 centipoises, e.g. a viscosity of 50 to 120 cps., "medium viscosity" means a viscosity between 20 and 50 cps., and "low viscosity" means a viscosity below 20 cps., e.g. 4 to 6 cps. measured at 20° C. and a 4% aqueous solution in the case of polyvinyl alcohol and measured at 20° C. on a monomolar benzene solution in the case of polyvinyl acetate.

In the preheating zone, as mentioned, the components of the polymerization mixture are directly intermixed by introducing them simultaneously, the catalyst suitably being dissolved in a small amount of methanol in order to give it the desired fluidity or, less desirably, the components may be intermixed prior to introduction into the preheating zone and then introduced in a single stream. The polymerization components being introduced are suitably at room temperature and the temperature in the preheating zone is thus slightly below temperature of the vapors which are used as the heating medium. Generally, the components are heated to reflux temperature in the preheating zone, which varies with variations in the composition of the feed, and they are advantageously accumulated in a body at the bottom of the zone before being transferred to the first polymerization zone and, as a result, they suitably have a residence time of 5 to 30 minutes in the preheating zone so that the induction period can be fully overcome and the desired polymerization initiated.

In the primary polymerization zone, polymerization is carried out with continuous agitation of the polymerization components and, as mentioned, at reflux, with the vaporized solvent passing through the preheating zone before it is condensed and returned to the primary polymerization zone. After polymerization has been carried out to provide the desired conversion, polymerization is continued in the second polymerization zone under the same conditions of temperature and agitation.

As a result of carrying out polymerization in the manner indicated, there is produced a product in which the degree of branching is very low and the degree of polymerization, and therefore the viscosity, can be generally closely controlled to any predetermined value. While polymerization is generally carried to a maximum conversion of about 70–80%, in the case of high viscosity polymer conversion is advantageously carried to about 30 to 50%, with 15 to 25% being effected in the primary polymerization zone. In the case of very low viscosity polymer, it is advantageous to add to the polymerization mixture 1 to 10% of an aldehyde such as acetaldehyde or propionaldehyde which reduces the degree of polymerization while keeping the proportions of solvent and catalyst to practical levels.

It will be understood that the degree of polymerization and the viscosity of the polymer are closely related and that, with a higher degree of polymerization there is obtained a higher viscosity polymer. In accordance with common usage, the term "degree of polymerization" means the average number of monomer units per polymer molecule, and this is, of course, a measure of molecular weight. The degree of polymerization is readily determined from the intrinsic viscosity of polymer in accordance with the following formula: $[\eta] = 7.50 \cdot 10^{-1} p^{-0.64}$ wherein $[\eta]$ is the intrinsic viscosity in ml./g. and wherein $p$ is the degree of polymerization. Intrinsic viscosity is suitably determined by conventional techniques in accordance with the procedure described on pages 309–314 of "Principles of Polymer Chemistry" by Paul J. Flory (Cornell University Press—1953), using an Ubbelohde (suspended level) Viscometer for methyl ethyl ketone solutions at 30° C. Molecular weight can be suitably determined by the well-known light-scattering method described, for example, on pages 283–303 of Flory. Thus, in accordance with the process of this invention polyvinyl alcohol having degrees of polymerization of from 100 to 3000 can be readily obtained and these degrees of polymerization can be predetermined by selecting the proportions of solvent, catalyst and monomer and the percentage conversion in the multistep polymerization reaction described above.

It will be understood that polymerization may be carried out batchwise or continuously and it is a feature of the polymerization process described above, including the use of a preheating zone, that it is particularly adapted for continuous operation. When operating continuously, the polymerization components are suitably introduced into the top of the primary polymerization zone and the partially polymerized mass is withdrawn from the bottom of the zone, with the recycled portion of the effluent being returned to the upper part of the zone. In the same manner, the partially polymerized mixture is introduced into the upper portion of the secondary polymerization zone and the final polymerization mass withdrawn from the bottom and partially recycled to the upper portion of the secondary polymerization zone. The rate of feed, withdrawal, and recycling will, of course, depend upon the size of the polymerization vessels and upon the percent of conversion being effected in each vessel. However, the desired flow rates for continuous operation can be readily determined. Generally, the flow of material should be such that the residence time in each polymerization zone is from about 1 to 3.5 hours.

After the finished polymerization mass has been withdrawn from the secondary polymerization zone, it is necessary to separate unreacted monomer. This is suitably effected by distillation. However, in order to reduce the likelihood of continued polymerization and in order to facilitate distillation, without the necessity of employing unduly elevated temperatures and pressures in the distillation zone, the polymerization mass is advantageously mixed with additional quantities of methanol, particularly in the case of high-viscosity and medium-viscosity polymer. Additional methanol is generally not necessary in the case of low-viscosity polymer since the polymerization mass is generally of sufficiently high fluidity owing to the substantial amount of methanol in it. When methanol is added, suitably 0.5 to 1.5 parts of methanol are added per part of polymerization mass. Such mixing of methanol and polymerization product may be effected by introducing methanol under pressure into the line through which the polymerization mass is being pumped to the distillation zone, but advantageously a separate mixing vessel is employed, with the methanol and the polymerization mass being introduced in separate streams into the mixing vessel and being withdrawn in a common stream. Any convenient mixing device may be employed for this purpose.

The distillation zone is suitably provided by a conventional distillation column provided with bubble plates, perforated plates or packing, e.g., Raschig rings, or the like, and heat is supplied and stripping of the vinyl acetate is effected by introducing methanol vapors into the lower portion of the distillation column and allowing them to move upwardly through the column. At the same time, water is advantageously introduced into the upper portion of the column and this water, as it moves downwardly through the column, greatly facilitates the desired separation of the components of the polymerized mass. One of the particular advantages of azo catalysts such as alpha,alpha'-azobisisobutyronitrile is the fact that they tend to decompose in the distillation zone and thus further polymerization is stopped. If, however, a catalyst is used which does not decompose in the distillation zone, then it is advantageous to introduce a polymerization inhibitor into the upper portion of the distillation zone. Any of the well-known inhibitors may be used, but particularly effective are amines, such as diphenylamine, or compounds such as hydroquinone. The quantity of inhibitor added generally corresponds to the quantity of catalyst contained in the polymerization mass and the quantity of water added suitably ranges from 0 to 10 parts, e.g. 1 to 10 parts, by weight per part of polymerizing mass introduced into the distillation column. The methanol introduced as vapor into the lower portion of the distillation zone is introduced in sufficient quantity to vaporize the vinyl acetate and to effect the desired distillation and stripping. Thus 0.75 to 1.5 parts by weight of methanol vapor are introduced per part of combined polymerized mass and water introduced into the upper part of the distillation zone. From the top of the distillation zone there are removed methanol and vinyl acetate and these are suitably separated by any convenient means, such as by further distillation, extraction or the like. The recovered methanol and vinyl acetate, after freeing it from inhibitor, if present, are recycled to the polymerization operation. Distillation is suitably carried out at substantially atmospheric pressure although a slight superatmospheric pressure, e.g. 5 pounds gauge, is suitably provided at the bottom of the column to cause the desired flow of methanol vapor. Thus, the methanol vapor is suitably introduced at a temperature of about 68–75° C. although the temperature will, of course, vary with the pressure.

The size of the distillation column is selected to provide the desired separation in accordance with known techniques. Thus, for example, a bubble cap column having about 45 actual plates is suitable with the flow rates referred to above. The diluted polymerization mass is introduced into the upper portion of the column, e.g. on the fourth plate, and, if desired, the stream may be subdivided and introduced on the fourth, sixth, eighth and tenth plates, for example.

From the bottom of the distillation zone, there is withdrawn a methanol solution of polyvinyl acetate substantially free from vinyl acetate monomer and catalyst and it is this solution, which is rather viscous and is commonly referred to as polyvinyl acetate "paste," which is used in the saponification operation to be described below, and is eventually substantially completely converted to polyvinyl alcohol. If desired, some of the methanol may be removed from the polyvinyl acetate paste as it is withdrawn from the bottom of the distillation zone and the evolved methanol vapors returned to the lower portion of the column to combine with the fresh methanol vapors introduced to maintain distillation, as described above. Such vaporization of methanol from the paste may be carried out in any convenient apparatus but advantageously it is carried out in a so-called "film evaporator" such as described in The Chemical Engineering Catalog and manufactured, for example, by the Pfaudler Co.

The distillation or stripping operation just described has the advantage not only of separating unreacted monomer from the polyvinyl acetate mass produced in the polymerization reaction, but it also produces a solution of polyvinyl acetate which is adapted to be used directly, after suitable dilution to make it more fluid, in the next step leading to the eventual production of high quality polyvinyl alcohol, i.e., by the saponification or "alcoholysis" reaction. The water, when introduced into the upper portion of the distillation zone, not only aids the separation of the components of the polymerization mass, particularly by breaking azeotropes which tend to form, but it also introduces water into the alcoholic solution of polyvinyl acetate which is withdrawn from the distillation zone and remains with the polyvinyl acetate paste during the saponification operation, and the subsequent steps to be described below leading to the final production of polyvinyl alcohol. It has been found that the presence of water when the polyvinyl alcohol reaches the drying operation is highly advantageous. Thus, the introduction of water into the distillation zone has a bearing upon the nature of the finally-produced product, particularly when a fiber-grade polyvinyl alcohol is to be produced.

Saponification or, more properly, "alcoholysis," is effected by bringing the mixture of polyvinyl acetate and methanol obtained in the above-described polymerization and polymer recovery procedure into intimate admixture with a saponification catalyst. The reaction may be illustrated generally by the following equation:

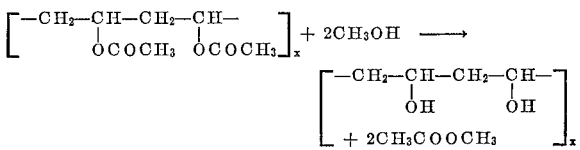

The catalyst used is suitably alkaline in nature, and preferably an alkali metal hydroxide, such as sodium hydroxide, is employed. The polyvinyl acetate paste as it is produced in the previously-described distillation zone, wherein unreacted vinyl acetate is removed, is generally too viscous for efficient saponification and, as previously mentioned, before it is introduced into the saponification zone with the saponification catalys, it is mixed with further quantities of methanol to produce a solution of 10 to 70 weight percent concentration, preferably a concentration of about 15 to 30%, e.g. about 20 weight percent. The catalyst, e.g. sodium hydroxide, is suitably introduced as either an aqueous solution or a methanolic solution, having a concentration of 1 to 30 weight percent. The proportion of catalyst to polyvinyl acetate is suitably 0.006 to 0.15% based on the mole weights of the catalyst and the polyvinyl acetate.

The saponification zone suitably consists of a mixing or blending zone and a communicating saponification zone proper. In the mixing or blending zone, the stream of polyvinyl acetate paste and the stream of saponification catalyst are combined and thoroughly agitated and then the mixture is passed into the saponification zone proper wherein the saponification reaction is promoted by further mixing the catalyst and the polyvinyl acetate paste at a temperature of 25 to 60° C. with concurrent positive propulsion of the saponified mass through the saponification zone. When it is desired to produce a substantially completely saponified polyvinyl alcohol, the quantity of catalyst and the residence time in the saponification zone are selected such that the polyvinyl alcohol issues from the saponification zone in admixture with free catalyst and with methyl acetate, which is produced as a by-product in the saponification reaction as shown in the above equation. This effluent, which is substantially a solid mass, is then passed to a saw-tooth crusher wherein the polyvinyl alcohol mass is crushed and subdivided. From the crusher, the mass is passed to a hammer mill which effects further subdivision, but before entering the hammer mill the crushed polyvinyl alcohol mass is diluted with mother liquor from the filtering operation, which lies downstream of the hammer mill and will be described in detail below. This mother liquor consists generally of methyl acetate, methanol and water and is introduced in the ratio of 0.5 to 5 parts by weight, preferably about 1 part by weight of mother liquor per part of polyvinyl alcohol mixture. The mixture issuing from the hammer mill then passes to a mixing zone where it is thoroughly mixed and formed into a substantially uniform slurry and this is then passed to a filtering zone wherein the solid portion of the slurry is separated from the liquid portion under vacuum. Filtration is thus effected in a vacuum drum filter which may be of any convenient type. The vacuum applied during filtration is suitably within the range of 125 to 635 mm. of mercury and the solids are thoroughly washed while on the filter by means of methanol in some cases advantageously containing water. Thus the wash liquor suitably consists of methanol, and 0 to 20 weight percent water. When substantially complete saponification is desired, the water content of the wash liquor is low, e.g. 0 to 10%. The quantity applied to he filter cake is also controlled and advantageously is 4 to 7 parts by weight per part of filter cake washed (dry basis), when thorough washing is desired.

The mother liquor obtained from the filtering step is withdrawn and part of it is sent to be mixed with the polyvinyl alcohol mass issuing from the crusher prior to its entry into the hammer mill, as described above. The remainder of the mother liquor is withdrawn from the system and is suitably treated to recover the methanol, sodium acetate, and methyl acetate values in any convenient manner such as described, for example, in Mention et al. U.S. Patent 2,650,249.

After the filter cake has been removed from the filter it is passed to a pressing zone which suitably expresses additional amounts of liquid from the filtered solids. The pressing zone is advantageously defined by a press, which is suitably in the form of a screw press of any convenient form, which discharges a material having a considerably lower content of liquid than the material introduced into the press. Thus the filter is conveniently operated to produce from the slurry which is fed to it a filter cake which has a liquid content of 70 to 75%, preferably 70 to 72% and which is, as indicated, fed to the screw press. The screw press, on the other hand, is operated to produce a pressed product having a liquid content of 30 to 60%, preferably about 50%. While this product thus has considerable liquid in it, including some water, it is, on the other hand, adapted to be comminuted and, in order to facilitate drying, it is accordingly passed to a pulverizer or like device of any convenient form where its particle size is reduced, preferably to about 20 mesh or less. From the pulverizer, the polyvinyl alcohol is passed to a drying zone wherein the quantities of liquid, including water, which are admixed with the solid polyvinyl alcohol, are removed and wherein, where there is a content of free saponification catalyst remaining, saponification is carried substantially to completion. Thus, when the saponified mass issues from the saponifier, it advantageously contains 0.6 to 1.0 mol percent saponification catalyst, e.g. sodium hydroxide, and after the subsequent treatments described above, including vacuum filtration, it reaches the dryer with a catalyst content of about 0.5 to 0.8% and is 98% to 99.5% saponified when a highly-saponified grade polyvinyl alcohol is desired, i.e. it contains at most about 0.7% of acetyl groups. In the drying zone, wherein the polyvinyl alcohol is tumbled and exposed to a temperature of 55 to 90° C. in an inert atmosphere of nitrogen or like inert gas, the saponification is carried further and a saponification of 99.9% can be achieved. There is thus produced a dried product having a very high degree of saponification and having other highly desirable characteristics, with a viscosity corresponding to the viscosity of the polyvinyl acetate from which it was produced, as determined in the polymerization operation previously described. Furthermore, by reason of the presence of water and residual catalyst along with methanol in the polyvinyl alcohol entering the dryer, there is produced a product which is particularly suitable for making fibers and will form fibers without discoloration or other undesirable action.

Upon issuing from the drying zone, the product is ready for classification and shipping and it may be suitably processed for this purpose in any convenient manner. Thus, it may be screened and blended with the product produced in prior operations so as to obtain a uniform product, with any dust or other undesired fine particles being effectively removed by blowing or any other convenient means.

As previously indicated, alkaline catalysts which are known as saponification catalysts for polyvinyl acetate may be employed. Preferably, as indicated above, sodium hydroxide is used as the catalyst. However, it has been found that particularly satisfactory results are obtained, when a fiber grade polyvinyl alcohol is desired, if the sodium hydroxide solution has mixed with it a quantity of sodium carbonate such that the solution is saturated, e.g. about 1.5%. The exact action of the sodium carbonate in combination with the sodium hydroxide is not fully understood, but it has been found that it leads to a maximum degree of saponification and produces a colorless product which remains colorless even when formed into fibers. In a preferred aspect of the invention, therefore, the polyvinyl acetate is saponified not only in the presence of sufficient methanol to react with all of the acetyl groups, but also in the presence of at least about 23% of sodium hydroxide and at least about 1% of sodium carbonate in the catalyst solution, and about 4% of water in the polyvinyl acetate solution, with washing of the product in the filter being controlled to leave sufficient saponification catalyst in the filter cake to catalyze substantially 100% saponification in the drying zone, wherein the wet catalyst containing polyvinyl alcohol is not only freed from moisture, but is also substantially 100% saponified.

The above-described operations may be effected in any convenient apparatus or combination of apparatus units, interconnected by suitable piping, pumps, and the like. The process of this invention, however, will be more fully understood by reference to the drawings which show a suitable system for the preparation of a polyvinyl acetate-methanol paste from monomeric vinyl acetate and for the subsequent preparation of polyvinyl alcohol, the paths of flow of the reactants and products through the integrated system being clearly illustrated.

Referring first to FIG. 1 of the drawings, there is shown at 10 a jacketed, agitated primary polymerization vessel which defines a primary polymerization zone and which is connected with a secondary jacketed, agitated polymerization vessel 12, which defines a secondary polymerization zone, by a line 14 containing a pump 16, with a line 18, controlled by a valve 19, being provided for recycling a portion of the reaction product from the bottom of vessel 10 into the top of the same vessel. Associated with the primary polymerization vessel 10, is the preheater 20 which receives methanol, vinyl acetate, and catalyst from storage units 22, 23 and 24 through lines 25, 26 and 27, respectively, the three lines discharging into the upper portion of the column 30 of the preheater.

The line 32 leads methanol vapors from the polymerization vessel 10 into column 20 and the vapors are withdrawn at the top of the column through a line 34 leading to a condenser 36, with condensate flowing back to vessel 10 through line 38. The column 30 is suitably provided with means to facilitate contact, which may be in the form of bubble plates or packing such as Berl Saddles, Raschig rings or the like. The lower portion 40 of preheater 20 is in the form of an open chamber which receives and accumulates the mixture of monomer, solvent and catalyst during the period of polymerization induction. A line 42 is provided for withdrawal to the polymerization vessel 10, line 42 suitably being a reverse U to maintain a desired level of liquid in chamber 40 and being controlled by a valve 44. Secondary polymerization vessel 12 is provided with a reflux condenser 46 connected to it by lines 48 and 50 and a line 52 containing a pump 54 is provided for withdrawal of polymerization product from the bottom of vessel 12. During operation, the two polymerization vessels and the preheater are provided with an inert atmosphere of nitrogen or other inert gas which is supplied by any convenient means (not shown). The polymerization vessels are normally maintained substantially half-full of polymerization mass at all times and any convenient level control means (not shown) may be provided. A return line 56 controlled by a valve 58 connects with line 52 for recycling of product to vessel 12.

Line 52 leads to a mixing vessel 60 which is connected by a line 62 controlled by a valve 64 to a methanol storage unit 66 which is also connected, by means of line 67, to methanol storage unit 22. Mixer 60 is connected by a line 68 to a distillation column 70 in which monomer and catalyst are separated from the polymerization mixture issuing from polymerization vessel 12. A source of water 72 communicates through a line 74 controlled by a valve 75 with the top of column 70 and a line 76 leads to a condenser 78 which is provided with a line 79 for forward flow and a line 80 controlled by a valve 82 for reflux to the column. Methanol vapors are introduced into the lower portion of column 70 through a line 84 which leads from a vaporizer 85 which is supplied with methanol from methanol storage unit 66 by a line 86 controlled by a valve 87. A line 88 controlled by a valve 89 leads from the bottom of column 70 for withdrawal of polyvinyl acetate "paste" to be subsequently used for conversion to polyvinyl alcohol. Line 88 leads to an evaporator 90 in which some of the methanol may be vaporized and the vapors introduced into the lower portion of column 70 through line 91 along with vapor from vaporizer 85. A by-pass line 92 controlled by a valve 93 leads from line 88 directly to a storage vessel 94 for transfer of paste when no evaporation is to be effected. Storage vessel 94 is connected by a valved line 95 to a dilution vessel 96 which receives methanol from storage unit 66 through a valved line 97 to prepare the paste for the saponification operation to which it is conducted through the valved line 98.

Figure 2:
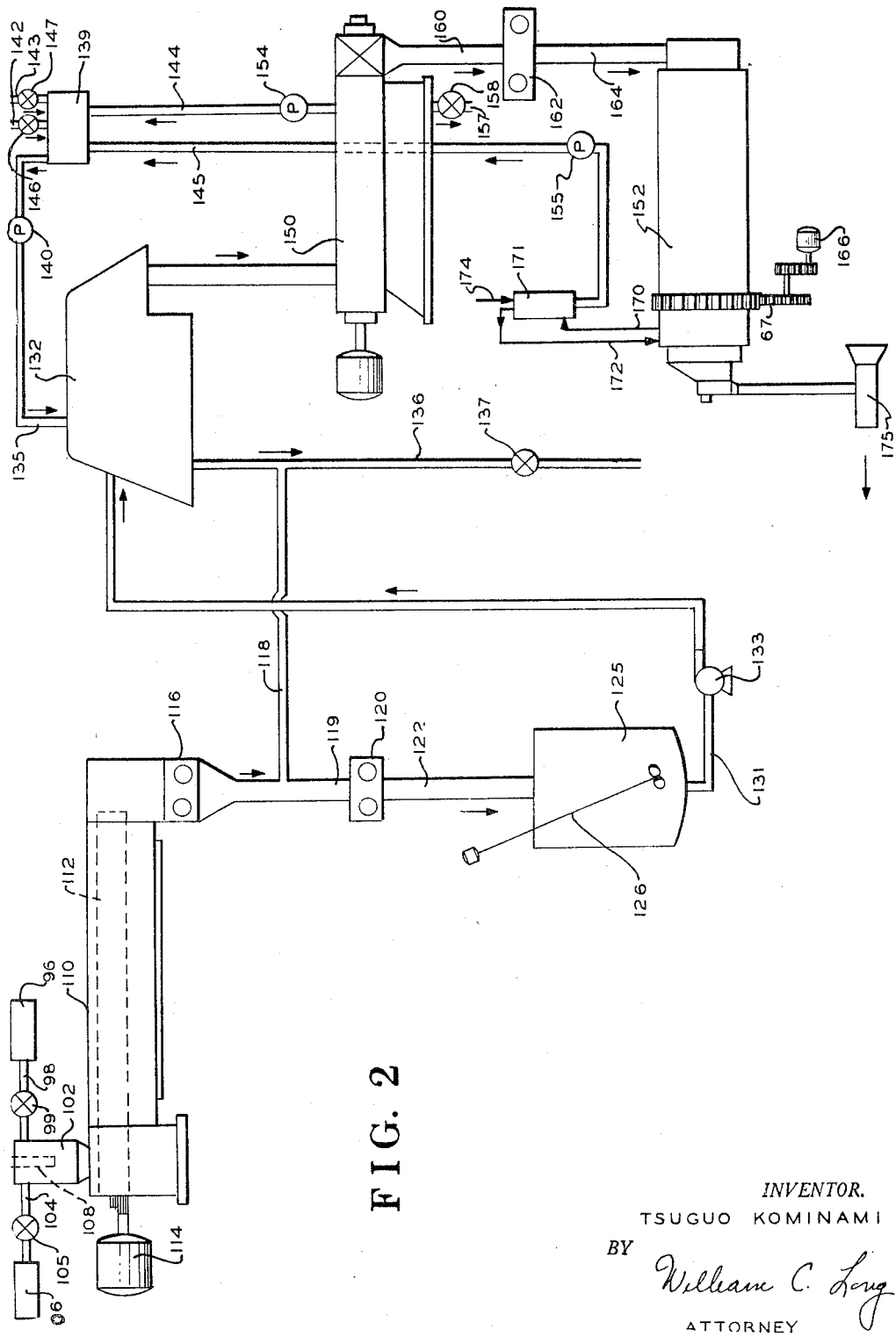
FIG. 2 is a similar view of a system wherein the polyvinyl acetate may be converted into dry, particulate, polyvinyl alcohol.

Referring now to FIG. 2, which illustrates a system in which the above-described saponification or "alcoholysis" of the polyvinyl acetate paste contained in dilution vessel 96 may be effectively carried out, line 98 controlled by valve 99 leads to a mixing unit 102 which is also connected by a line 104 controlled by a valve 105 with a catalyst supply vessel 106. Mixing unit 102 has an agitator indicated diagrammatically at 108 and discharges into saponifier 110 which suitably contains a screw mixing and propelling means, indicated diagrammatically at 112, driven from a motor 114. For best results the mixer and saponifier disclosed in copending applications Serial Nos. 643,418 and 643,419, both filed March 1, 1957, are suitably used and these will be more particularly described below. The saponifier 110 discharges into a crusher 116 of any convenient type such as a saw-tooth crusher. The crushed product flows by gravity through a conduit 119 to a grinder 120 where further comminution is effected. The grinder is suitably of conventional type such as a hammer mill. The grinder 120 discharges into a conduit 122 which in turn discharges into a tank 125 provided with an agitator as indicated at 126. Connected to the conduit 119 is a line 128 for supplying fluid to form a slurry of the comminuted saponification product. The slurry is withdrawn from the bottom of tank and transferred to a filter 132 through a line 131 which is suitably provided with a pump 133. Filter 132 is advantageously a vacuum filter or any convenient type and a particularly suitable filter is a vacuum drum filter. Wash liquor is introduced into the filter for washing the filter cake through line 135 and filtrate is withdrawn through line 136 controlled by a valve 137. As previously indicated, some of the filtrate is introduced into conduit 119 above grinder 120 to form the polyvinyl alcohol slurry and the remainder is withdrawn from the system for recovery in any convenient recovery system (not shown). Wash liquor is supplied to line 135 from a wash liquor reservoir 139 by means of a pump 140 and the reservoir 139 is in turn supplied through lines 142, 143, 144 and 145. Line 142, controlled by a valve 146, communicates with methanol reservoir 66; line 143, controlled by a valve 147 is connected to a source of water; line 144 and line 145 lead from press 150 and dryer 152, respectively for conduction of the fluids removed from the polyvinyl alcohol in these two units to the wash liquor reservoir. Pumps 154 and 155 are suitably provided in lines 144 and 145, respectively.

From filter 132, the filter cake falls by gravity to a pressing device 150, suitably in the form of a screw press.

In the screw press, liquid contained in the polyvinyl alcohol coming from the filter is expressed mechanically. All or part of the expressed liquid may be pumped to reservoir 139 through line 144, or all or part of it may be withdrawn from the system through line 157 controlled by valve 158. The outlet end of the press 150 communicates with a duct 160 leading to a pulverizer 162 such as a hammer mill, in which the partially dried polyvinyl alcohol is further comminuted. The outlet of the pulverizer 162 communicates with a second duct 164 which leads to the dryer 152 which is suitably a rotary drum dryer heated electrically or by steam and rotated by a motor 166 through conventional gearing 167. Advantageously an atmosphere of nitrogen or other inert gas is provided in the ducts 160 and 164 in the pulverizer 162 and in the dryer 152 and vapors evolved in the dryer along with the nitrogen are passed through a line 170 to a condenser-scrubber 171 wherein the condensible vapors are condensed and separated from the non-condensable inert gas which is returned to the dryer through the line 172 while the condensate flows into line 145. Scrubbing is suitably effected by countercurrent flow of water or previously condensed liquid which is introduced at 174. The dried product polyvinyl alcohol flows from the outlet of the dryer 152 into a pneumatic conveyor indicated at 175 by means of which it is conveyed to grading and packaging operations (not shown).

As will be seen from the foregoing, standard apparatus units are generally used in carrying out the above-described process operations. However, in the saponification operation, it is highly advantageous to combine the mixing and saponification devices disclosed in copending applications of Akaboshi, Uragami and Fukai, Serial Nos. 643,418 (now U.S. Patent No. 3,072,464, dated January 8, 1962) and 643,419 (now abandoned), filed March 1, 1957. The devices disclosed in these applications make possible the efficient handling of the saponification mass provided in accordance with this invention which changes from a readily flowable fluid to a substantially solid mass in the course of the reaction between the methanol and the polyvinyl acetate in the presence of the alkaline catalyst.

Thus, when the solution of polyvinyl acetate in methanol is mixed with the sodium hydroxide solution to produce polyvinyl alcohol, the two solutions maintain the liquid phase in which they are mixed for about ten seconds from the first moment of mixing, and the viscosity of the solution actually becomes lower for a short time thereafter. However, it then gradually becomes higher as mixing is continued and the liquid phase passes into a pasty phase and then into a substantially solid phase which has adhesive characteristics. The complete change to a solid polyvinyl alcohol thus occurs within a period of a few minutes. As a consequence, in order to obtain a polyvinyl alcohol of uniform quality while carrying out the reaction continuously, it is necessary to use a continuous mixing device which effects a sufficiently uniform mixing in a very short time and then to transfer the mixture immediately to a saponifying device which can effectively handle the solid material as mixing and saponification are continued.

Thus in the initial mixing operation in which the polyvinyl acetate solution and the catalyst solution are combined and saponification initiated, one of the solutions is caused to flow along the inner wall of a casing as a thin layer, and at the same time the other solution is mixed with the first solution in the form of a thin film, the mixed films then being repeatedly dispersed and caused to flow along downwardly inclined surfaces. After this initial intimate mixing operation, the partially saponified mass, which is tending to increase in viscosity and to become adhesive, is passed into the saponification zone wherein the mass as it becomes solid and adhesive is propelled over surfaces which are continuously wiped as the mass is further mixed.

The combined apparatus in which this continuous mixing and saponifying operation is effectively carried out, and which results from a combination of the apparatus units disclosed in the above-mentioned copending applications, and which is the subject matter of the application of Akaboshi, Uragami and Fukai filed on even date herewith, is shown in detail in FIGS. 3 and 4 and comprises the mixing unit 102 and the saponifier 110. As seen in FIG. 3, the mixing unit 102 has a cylindrical casing 101' with a cover 102', inlet lines 98 and 104 communicate with the interior of the upper portion of casing 101' which is divided into a plurality of chambers by a partition 104' which has a bell-shaped lower portion 105' forming a narrow annular passage between its peripheral edge and the inner wall of the casing 101'. Interiorly of the partition 104', is a second bell-shaped partition plate 106'. As will be seen in FIG. 3, the inlet line 104 for the catalyst solution leads into the inner annular chamber defined between the partitions 104' and 105' whereas the inlet 98 for the polyvinyl acetate solution leads into the outer annular chamber defined between casing 101' and partition 104'. The vertical agitator shaft 108 extends axially into the casing 101' and is supported to be rotated at a high speed by any convenient driving means (not shown). The shaft 108 carries blades 108' and a disc 109'. Funnel-shaped guide walls or partition plates 110' and 111' are secured to the wall of casing 101' and direct the downwardly mixing film of saponification mixture axially inwardly into contact with blades 108' and disc 109'. A discharge opening 112' is formed at the bottom of casing 101' and communicates directly with the inlet 125' of saponifier 110. As will be seen in FIG. 4, the saponifier is defined by a casing 121', a first screw 122' rotatably mounted in the casing on a shaft 123' connected to a driving pinion 124'. A delivery opening 126' is formed in the lower portion of the casing at the end opposite the inlet 125'. Cooperating with the screw 122' is a wiping and confining contact member which has surfaces which slide on the surfaces of screw 122' and effectively wipe them.

In this embodiment the confining contact member is in the form of a screw member 127'. A gear wheel 124a carried by the screw shaft 123a and gear wheel 124' secured to shaft 123' mesh with a common driving gear wheel 131 so that the parallel screws 122' and 127' cooperate and rotate in the same direction. The casing 101' is shaped to define intersecting cylinders which closely confine the screws 122' and 127' and the two screws also closely engage each other with as small a clearance as possible without impeding the desired relative movement.

When the mixer-saponifier assembly is in operation, the methanol solution of polyvinyl acetate is supplied through line 98 into casing 101' and the alkaline catalyst solution is fed through the line 104 into the inner chamber enclosed by the partition 104'. The polyvinyl acetate solution flows down in the form of thin film through the narrow annular slit between the outer peripheral edge of the partition portion 105' and the inner surface of the casing 101' and at the same time the catalyst solution flows down along the upper surface of the bell-shaped partition 106' as a thin layer and the two solutions then intermix and are guided inwardly by the guide plate 110' and are then thrown radially outwardly by the rotating blades 108' which are disposed beneath the opening of the funnel-shaped member 110'. The mixed solutions impinge upon the inner wall of the casing, and further intermix. The mixed solutions continue to flow downwardly and inwardly along the guide plate 111' and are thrown radially by revolving disc 109' and thus become uniformly mixed and finally flow from delivery opening 112'.

During the above operation, the two solutions are brought into intimate contact with each other and saponification is begun and, while the viscosity of solutions becomes lower, they are uniformly and effectively intermixed and the mixture is delivered through the outlet opening 112' to the saponifying device as the solution begins to increase in viscosity.

The mixture leaving outlet 112' enters through inlet 125' into the reaction casing, and is gradually conveyed to the outlet 126' by means of the screw 122' and screw-shaped contact member 127'. Since the screw 122' and the screw-shaped contact member 127' are arranged to rotate in the same direction as shown in FIG. 4, there is relative movement along the direction of the circumference of the screw in the wave-formed-curved portions, $a$, $b$, $c$, $d$, $e$, caused by the contact of the two parallel screws. As a result, there is provided an effective conveying, mixing and wiping action so that the solid, somewhat adhesive saponification product is effectively formed and conveyed continuously. The time necessary for the completion of reaction can be regulated simply by adjusting the number of revolutions of the screws.

The following specific examples will serve to show the invention more fully but it will be understood that these examples are illustrative only and are not to be considered as limitative of the invention, all parts and percentages being by weight unless otherwise indicated.

*Example 1*

This example shows the preparation of a medium viscosity saponified polyvinyl alcohol suitable for use in the formation of fibers. Methanol, vinyl acetate and alpha,alpha'-azobisisobutyronitrile (AZN) were fed to the top of the preheating zone 20 through lines 25, 26 and 27, respectively, at the rate, per hour, of 257 parts of methanol, 1035 parts of vinyl acetate and 0.245 part of AZN, the preheating zone being at a temperature of 59° C. and heated by vapors issuing from the primary polymerization zone 10. The three components of the polymerization mixture were accumulated in the accumulation zone 40 and continuously fed to the primary polymerization zone 10 after a residence time of 15 minutes in the preheating and accumulating zones. In the primary polymerization zone 10, the mixture was maintained at reflux under agitation at refluxing temperature. A residence time of 1.74 hours in the primary polymerization zone was provided and a conversion of 25% was realized. From the primary polymerization zone, the partial polymerized mixture was passed to the secondary polymerization zone 12, with a major proportion of the mixture withdrawn from the bottom of zone 10 being returned as recycle to the top of zone 10 through lines 14 and 18, the reflux ratio being 3:1. In the secondary zone 12 polymerization continued under the same conditions prevailing in the primary zone, including a residence time of 1.74 hours and a reflux ratio of 3:1, the conversion being raised to 50%. The product polyvinyl acetate withdrawn through line 52 was found to have a viscosity of 60 cps. and a degree of polymerization of 1750.

The polymerization mixture thus withdrawn was mixed with methanol in mixing zone 60 with methanol in the proportion of 0.90 part of methanol per part of polymerization mixture and then passed into rectification and stripping zone 70 maintained at a temperature of 70° C. at its bottom and 62.5° C. at its top and with a pressure gradient from 0 lb. gauge to 17 lb. gauge. The polymerization product-methanol mixture was introduced into zone 70 at the rate of 1382 parts per hour and methanol vapors at 70° C. were introduced at the rate of 1500 parts per hour. Simultaneously water was introduced through line 74 at the rate of 0.06 part per part of polymerization product-methanol mixture. Polyvinyl acetate paste containing about 15% polyvinyl acetate was withdrawn from the bottom of zone 70 and fed to evaporating zone 90 maintained at a temperature of 70° C. and 15% of the methanol was vaporized and introduced into the bottom of zone 70 along with methanol vapor from vaporizer 85 to provide the stripping vapors in zone 70. Finally the thus-treated polyvinyl acetate paste, with a polymer concentration of 22%, was accumulated in storage zone 94 ready for subsequent conversion to polyvinyl alcohol.

To effect conversion of the polyvinyl acetate in the "paste" in zone 94, this paste was mixed with methanol in mixing zone 96 in the proportion of 0.1 part of methanol per part of paste and the resultant mixture was fed continuously, together with a 23% aqueous solution of sodium hydroxide, into mixing zone 102. The paste was supplied at the rate of 260 parts per hour and the alkali solution was fed at the rate of 13.7 parts per hour. After passing through the mixing and blending zone 102 in the course of 0.1 minute, the resultant mixture was continuously introduced into the saponification zone 110 maintained at a temperature of 40° C. Passage through the saponification zone required 3 minutes and the crude saponification product issuing from the zone contained polyvinyl alcohol which was 99.5% saponified and contained 0.05 part of free NaOH per part of polymer. The crude saponification product was then crushed to an average particle size of 1″ in crushing zone 116 and ground in grinding zone 120 to a particle size of less than 40 mesh. The comminuted product was then slurried with one part of mother liquor from filtration zone 132 per part of product and pumped to the filtration zone 132 operated under an absolute pressure of 200 mm. Hg. As the filter cake was formed on the filter drum, it was washed with 2 parts, per part of filter cake, of a wash liquor consisting of 90% methanol, 1% methyl acetate and 9% water. Upon removal from the filter drum, the washed filter cake had a solids content of 30% and contained 0.002 part of NaOH per part of polymer solid. This product was then pressed in pressing zone 150 to increase its solids content to 50%, and it was then comminuted in pulverizing zone 162 to a particle size of less than 40 mesh. From the pulverizing zone the polyvinyl alcohol was passed to drying zone 152 which was heated to a temperature of 85° C. and had a nitrogen atmosphere. The residence time in the drying zone was 30 minutes during which period saponification was completed to 99.9% saponification by reason of the presence of free NaOH in the material entering the drying zone, and the dried product was of light color and had a viscosity of 32 cps. and a degree of polymerization of 1700.

Example 2

This example shows the preparation of a high viscosity saponified polyvinyl alcohol suitable for use in adhesives. Methanol, vinyl acetate and AZN were fed to the top of the preheating zone 20 through lines 25, 26 and 27, respectively at the rate, per hour, of 150 parts of methanol, 1733 parts of vinyl acetate and 0.207 part of AZN, the preheating zone being at a temperature of 59° C. and heated by vapors issuing from the primary polymerization zone 10. The three components of the polymerization mixture were accumulated in the accumulation zone 40 and continuously fed to the primary polymerization zone 10 after a residence time of 8 minutes in the preheating and accumulating zones. In the primary polymerization zone 10, the mixture was maintained at reflux under agitation at refluxing temperature. A residence time of 1.22 hours in the polymerization zone was provided and a conversion of 15% was realized. From the primary polymerization zone, the partial polymerized mixture was passed to the secondary polymerization zone 12, with a major proportion of the mixture withdrawn from the bottom of zone 10 being returned as a recycle to the top of zone 10 through lines 14 and 18, the reflux ratio being 3:1. In the secondary zone 12 polymerization continued under the same conditions prevailing in the primary zone, including a residence time of 1.22 hours and a reflux ratio of 3:1, the conversion being raised to 30%. The product polyvinyl acetate withdrawn through line 52 was found to have a viscosity of 110 cps. and a degree of polymerization of 2700.

The polymerization mixture thus withdrawn was passed into rectification and stripping zone 70 maintained at a temperature of 62.5° C. at its bottom and 70° C. at its top and with a pressure gradient from 0 lb. gauge to 1.7 lb. gauge. The polymerization product-methanol mixture was introduced into zone 70 at the rate of 1880 parts per hour and methanol vapors at 70° C. were introduced at the rate of 2100 parts per hour. Simultaneously water was introduced through line 74 at the rate of 0.08 part per part of polymerization product-methanol mixture. Polyvinyl acetate paste containing about 22% polyvinyl acetate was withdrawn from the bottom of zone 70. Finally the thus-treated polyvinyl acetate paste, with a polymer concentration of 22%, was accumulated in storage zone 94 ready for subsequent conversion to polyvinyl alcohol.

To effect conversion of the polyvinyl acetate in the "paste" in zone 94, this paste was mixed with methanol in mixing zone 96 in the proportion of 0.1 part of methanol per part of paste and the resultant mixture was fed continuously, together with a 23% aqueous solution of sodium hydroxide, into mixing zone 102. The paste was supplied at the rate of 4000 parts per hour and the alkali solution was fed at the rate of 92 parts per hour. After passing through the mixing and blending zone 102 in the course of 0.1 minute, the resultant mixture was continuously introduced into the saponification zone 110 maintained at a temperature of 40° C. Passage through the saponification zone required 3 minutes and the crude saponification product issuing from the zone contained polyvinyl alcohol which was 99.5% saponified and contained 0.002 part of free NaOH per part of polymer. The crude saponification product was then crushed to an average particle size of 1 mesh in crushing zone 116 and ground in grinding zone 120 to an average particle size of 40 mesh. The comminuted product was then slurried with 1 part of mother liquor from filtration zone 132 per part of product and pumped to the filtration zone 132 operated under an absolute pressure of 200 mm. Hg. As the filter cake was formed on the filter drum, it was washed with 2 parts, per part of filter cake, of a wash liquor consisting of 90% methanol, 1% methyl acetate and 9.0% water. Upon removal from the filter drum, the washed filter cake had a solids content of 25% and contained 0.002 part of NaOH per part of polymer solid. This product was then pressed in pressing zone 150 to increase its solids content to 45%, and it was then comminuted in pulverizing zone 162 to an average particle size of less than 40 mesh. From the pulverizing zone the polyvinyl alcohol was passed to drying zone 152 which was heated to a temperature of 85° C. and had a nitrogen atmosphere. The residence time in the drying zone was 25 minutes during which period saponification was completed to 99.9% saponification by reason of the presence of free NaOH in the material entering the drying zone, and the dried product was of light color and had a viscosity of 59 cps. and a degree of polymerization of 2650.

Example 3

The procedure described in Example 1 was repeated except that as polymerization catalyst there was used 1 part of benzoyl peroxide instead of 0.245 part of AZN. The product polyvinyl acetate withdrawn from the secondary polymerization zone 12 was found to have a viscosity of 32 cps. and a degree of polymerization of 1500. After saponification and drying, the product polyvinyl alcohol had a viscosity of 18 cps. and a degree of polymerization of 1450 and was 99.9% saponified.

Example 4

The procedure described in Example 2 was repeated except that as polymerization catalyst there were used 0.3 part of acetyl peroxide instead of 0.207 part of AZN. The product polyvinyl acetate withdrawn from the secondary polymerization zone 12 was found to have a viscosity of 110 cps. and a degree of polymerization of 2700. After saponification and drying, the product polyvinyl alcohol had a viscosity of 58 cps. and a degree of polymerization of 2650 and was 99.85% saponified.

Example 5

This example shows the preparation of a low viscosity saponified polyvinyl alcohol suitable for use in the sizing of textiles. Methanol, vinyl acetate and a mixture of AZN and acetaldehyde were fed to the top of the preheating zone 20 through lines 25, 26 and 27, respectively, at the rate, per hour, of 705 parts of methanol, 1050 parts of vinyl acetate, 0.315 part of AZN, and 70 parts of acetaldehyde, the preheating zone being at a temperature of 59° C. and heated by vapors issuing from the primary polymerization zone 10. The components of the polymerization mixture were accumulated in the accumulation zone 40 and continuously fed to the primary polymerization zone 10 after a residence time of 10 minutes in the preheating and accumulating zones. In the primary polymerization zone 10, the mixture was maintained at reflux under agitation at the refluxing temperature. A residence time of 1.24 hours in the polymerization zone was provided and a conversion of 35% was realized. From the primary polymerization zone, the partial polymerized mixture was passed to the secondary polymerization zone 12, with a major proportion of mixture withdrawn from the bottom of zone 10 being returned as recycle to the top of zone 10 through lines 14 and 18, the reflux ratio being 3:1. In the secondary zone 12 polymerization continued under the same conditions prevailing in the primary zone, including a residence time of 1.24 hours and a reflux ratio of 3:1, the conversion being raised to 70%. The product polyvinyl acetate withdrawn through line 52 was found to have a viscosity of 12 cps. and a degree of polymerization of 500.

The polymerization mixture thus withdrawn was passed into rectification and stripping zone 70 maintained at a temperature of 70° C. at its bottom and 62.5° C. at its top and with a pressure gradient from 0 lb. gauge to 1.7 lbs. gauge. The polymerization product-methanol mixture was introduced into zone 70 at the rate of 1312 parts per hour and methanol vapors at 70° C. were introduced at the rate of 1400 parts per hour. Polyvinyl acetate paste containing about 50% polyvinyl acetate was withdrawn from the bottom of zone 70. Finally the thus-treated polyvinyl acetate paste, with a polymer concentration of 50%, was accumulated in storage zone 94 ready for subsequent conversion to polyvinyl alcohol.

To effect conversion of the polyvinyl acetate in the "paste" in zone 94, this paste was fed continuously together with a 23% aqueous solution of sodium hydroxide, into mixing zone 102. The paste was supplied at the rate of 1680 parts per hour and the alkali solution was fed at the rate of 34 parts per hour. After passing through the mixing and blending zone 102 in the course of 0.1 minute, the resultant mixture was continuously introduced into the saponification zone 110 maintained at a temperature of 45° C. Passage through the saponification zone required 5 minutes and the crude saponification product issuing from the zone contained polyvinyl alcohol which was 99.5% saponified and contained 0.02 part of free NaOH per part of polymer. The crude saponification product was then crushed to an average particle size of 5 mesh in crushing zone 116 and ground in grinding zone 120 to an average particle size of 10 mesh. The comminuted product was then slurried with 1 part of mother liquor from filtration zone 132 per part of product and pumped to the filtration zone 132 operated under an absolute pressure of 200 mm. Hg. As the filter cake was formed on the filter drum, it was washed with 1 part, per part of filter cake, of a wash liquor consisting of 70.6% methanol, 28% methyl acetate and 1.4% water. Upon removal from the filter drum, the washed filter cake had a liquid content of 65% and contained 0.001 part of NaOH per part of polymer solid. This product was then pressed in pressing zone 150 to increase its solids content to 40%, and it was then comminuted in pulverizing zone 162 to an average particle size of 16 mesh. From the pulverizing zone the polyvinyl alcohol was passed to drying zone 152 which was heated to a temperature of 85° C. and had a nitrogen atmosphere. The residence time in the drying zone was 240 minutes during which period saponification was completed to 99.9% saponification by reason of the presence of free NaOH in the material entering the drying zone, and the dried product was of light color and had a viscosity of 5 cps. and a degree of polymerization of 500.

*Example 6*

A polyvinyl acetate "paste" was prepared as described in Example 1. This paste was mixed with methanol in mixing zone 96 in the proportion of 0.5 part of methanol per part of paste and the resultant mixture is fed continuously, together with a 23% aqueous solution of sodium hydroxide containing 1.0% of sodium carbonate, into mixing zone 102. The paste was supplied at the rate of 4300 parts per hour and the alkali solution was fed at the rate of 260 parts per hour, the sodium carbonate thus being fed at the rate of 2.6 parts per hour. After passing through the mixing and blending zone 102 in the course of 0.1 minute, the resultant mixture was continuously introduced into the saponification zone 110 maintained at a temperature of 40° C. Passage through the saponification zone required 2 minutes and the crude saponification product issuing from the zone contained polyvinyl alcohol which was 99.2% saponified and contained 0.002 part of free NaOH and 0.0015 part of sodium carbonate per part of polymer. The crude saponification product was then crushed to an average particle size of 1 mesh in crushing zone 116 and ground in grinding zone 120 to an average particle size of 40 mesh. The comminuted product was then slurried with 1 part of mother liquor from filtration zone 132 per part of product and pumped to the filtration zone 132 operated under an absolute pressure of 200 mm. Hg. As the filter cake was formed on the filter drum, it was washed with 2 parts, per part of filter cake, of a wash liquor consisting of 90% methanol, 1% methyl acetate and 9% water. Upon removal from the filter drum, the washed filter cake had a solids content of 28% and contained 0.002 part of NaOH and 0.004 part of sodium carbonate per part of polymer solid. This product was then pressed in pressing zone 150 to increase its solids content to 45%, and it was then comminuted in pulverizing zone 162 to an average particle size of less than 40 mesh. From the pulverizing zone the polyvinyl alcohol was passed to drying zone 152 which was heated to a temperature of 82° C. and had a nitrogen atmosphere. The residence time in the drying zone was 31 minutes during which period saponification was completed to 99.93% saponification by reason of the presence of free NaOH and the sodium carbonate in the material entering the drying zone, and the dried product was of light color and had a viscosity of 32 cps. and a degree of polymerization of 1750.

It will be understood that various changes and modifications may be made without departing from the invention as defined in the appended claims and it is intended, therefore, that all matter contained in the foregoing description and in the accompanying drawings shall be interpreted as illustrative only and not as limitative of the invention.

This application is a continuation of my co-pending application Serial No. 862,626, filed December 29, 1959 for "Process for Producing Polyvinyl Alcohol" (now abandoned).

I claim:

1. A process of producing by solution polymerization a substantially linear polyvinyl acetate homopolymer suitable for conversion by saponification into polyvinyl alcohol of a predetermined degree of polymerization which comprises the steps of continuously combining vinyl acetate with methanol and a polymerization catalyst selected from the group consisting of organic peroxides and azo compounds in a mixing zone while heating the resultant mixture for 5 to 30 minutes, continuously introducing a stream of the heated mixture into a first polymerization zone wherein the contents of said polymerization zone are maintained at reflux temperature, maintaining the introduced vinyl acetate, methanol and catalyst in said first polymerization zone to effect partial homopolymerization and to provide a conversion to homopolymer of at least about 15% of the vinyl acetate in said introduced stream, continuously transferring a portion of the resultant partially-polymerized mass to a second polymerization zone wherein the contents of said second polymerization zone are maintained at reflux temperature while recycling the remainder of said partially-polymerized mass to said first zone, the ratio of recycled partially-polymerized mass to the quantity of said partially-polymerized mass transferred to said second polymerization zone being between about 2:1 and 4:1, maintaining said partially-polymerized mass in said second polymerization zone until at most 80% conversion has been effected, continuously removing the polymerized product from said second polymerization zone, recycling a portion of said product to said second polymerization zone in the proportion of about 2:1 and 4:1, diluting said polymerization product removed from said second polymerization zone with further quantities of methanol substantially immediately after removal from said second polymerization zone, removing unreacted vinyl acetate from the diluted polymerization product by introducing said diluted product into an intermediate point of a fractional distillation zone while introducing vaporized methanol into a lower portion of said distillation zone and while introducing water into an upper portion of said distillation zone, to provide said mixture substantially free from vinyl acetate as a stream from the bottom of said distillation zone.

2. A process of making fiber-grade polyvinyl alcohol which comprises the steps of continuously combining vinyl acetate with methanol and a polymerization catalyst selected from the group consisting of organic peroxides and azo compounds in a mixing zone while heating the resultant mixture for 5 to 30 minutes, continuously introducing a stream of the heated mixture into a first polymerization zone wherein the contents of said polymerization zone are maintained at reflux temperature, maintaining the introduced vinyl acetate, methanol and catalyst in said first polymerization zone to effect partial homopolymerization and to provide a conversion to homopolymer of at least about 15% of the vinyl acetate in said introduced stream, continuously transferring a portion of the resultant partially-polymerized mass to a second polymerization zone wherein the contents of said second polymerization zone are maintained at reflux temperature while recycling the remainder of said partially-polymerized mass to said first zone, the ratio of recycled partially-polymerized mass to the quantity of partially-polymerized mass transferred to said second polymerization zone being between about 2:1 and 4:1, maintaining said partially-polymerized mass in said second polymerization zone until at most 80% conversion has been effected, continuously removing the polymerized product from said second polymerization zone, recycling a portion of said product to said second polymerization zone, in the proportion of about 2:1 and 4:1, diluting said polymerization product removed from said second polymerization zone with further quantities of methanol substantially immediately after removal from said second polymerization zone, introducing the diluted product into an intermediate point of a fractional distillation zone while introducing vaporized methanol into a lower portion of said distillation zone and while introducing water into an upper portion of said distillation zone, to provide a stream substantially free from vinyl acetate from the bottom of said distillation zone and consisting essentially of polyvinyl acetate homopolymer, methanol and water, intimately mixing said stream with an aqueous alkaline catalyst and introducing the catalyst-containing stream into a saponification zone wherein said catalyst-containing stream is caused to interact and to provide an effluent containing polyvinyl alcohol and at least about 0.6 mol percent free alkaline catalyst, diluting the effluent from said saponification zone in a diluting zone to form a flowable slurry, filtering the flowable slurry to provide a filtrate and a polyvinyl alcohol filter cake, recycling at least part of said filtrate to said diluting zone, whereby the filtrate is used to dilute said effluent, washing said filter cake with methanol and with a second portion of said filtrate to remove salts from said cake but to leave at least about 0.5 mol percent of said alkaline catalyst therein, and drying the thus-washed filter cake, whereby saponification continues to substantially 100% completion during said drying.

3. A process of producing polyvinyl alcohol of fiber-forming grade which comprises the steps of combining vinyl acetate, methanol, and a polymerization catalyst selected from the group consisting of organic peroxides and azo compounds in a mixing zone while heating the resultant mixture for 5 to 30 minutes, continuously introducing a stream of the heated mixture into a first polymerization zone wherein the contents of said polymerization zone are maintained at reflux temperature and wherein the refluxing vapors are introduced into said mixing zone to effect said heating of said mixture, maintaining the introduced vinyl acetate, methanol and catalyst in said first polymerization zone for 1 to 3.5 hours to effect partial homopolymerization of said vinyl acetate and to provide a conversion to homopolymer of at least about 15%, transferring a portion of the resultant partially-polymerized mass to a second polymerization zone wherein the contents of said second polymerization zone are maintained at reflux temperature for 1 to 3.5 hours while recycling the remainder of said partially-polymerized mass to said first polymerization zone, the ratio of recycled partially-polymerized mass to the quantity of said partially-polymerized mass transferred to said second polymerization zone being between about 2:1 and 4:1, the percentage conversion in said second polymerization zone not exceeding 80%, withdrawing polymerization product from said second polymerization zone while recycling a portion of said product to said second polymerization zone in the proportion of about 2:1 and 4:1, diluting said withdrawn polymerization product with methanol in the amount of 0.5 to 1.5 parts of methanol per part of withdrawn product, introducing the diluted product into an intermediate point of a fractional distillation zone while introducing vaporized methanol into a lower portion of said distillation zone and while introducing water into an upper portion of said distillation zone, the quantity of said methanol vapors being 0.75 to 1.5 parts by weight per part of combined diluted product and water, withdrawing a stream of methanol, water and polyvinyl acetate homopolymer from the bottom of said distillation zone and forming said last-named stream into a slurry, intimately mixing said slurry with an aqueous alkaline catalyst and introducing the resultant catalyst-containing slurry into a saponification zone wherein said catalyst-containing slurry is caused to interact and to provide an effluent containing polyvinyl alcohol and at least about 0.002 part of free alkaline catalyst per part of polyvinyl alcohol, diluting the effluent from said saponification zone in a diluting zone to form a flowable slurry, filtering the flowable slurry to provide a filtrate and a polyvinyl alcohol filter cake, recycling at least part of said filtrate to said diluting zone, whereby the filtrate is used to dilute said effluent, washing said filter cake with methanol and with a second portion of said filtrate to remove salts from said cake but to leave at least about 0.001 part of said alkaline catalyst therein per part of polyvinyl alcohol and drying the thus-washed filter cake, whereby saponification continues to substantially 100% completion during said drying.

4. A process of producing polyvinyl alcohol of fiber-forming grade which comprises the steps of combining vinyl acetate, methanol, and a polymerization catalyst selected from the group consisting of organic peroxides and azo compounds in a mixing zone while heating the resultant mixture for 5 to 30 minutes, continuously introducing a stream of the heated mixture into a first polymerization zone wherein the contents of said polymerization zone are maintained at reflux temperature and wherein the refluxing vapors are introduced into said mixzone to effect said heating of said mixture, maintaining the introduced vinyl acetate, methanol and catalyst in said first polymerization zone for 1 to 3.5 hours to effect partial homopolymerization of said vinyl acetate and to provide a conversion to homopolymer of at least about 15%, transferring a portion of the resultant partially-polymerized mass to a second polymerization zone wherein the contents of said second polymerization zone are maintained at reflux temperature for 1 to 3.5 hours while recycling a portion of said partially-polymerized mass to said first polymerization zone, the ratio of recycled partially-polymerized mass to the quantity of said partially-polymerized mass transferred to said second polylmerization zone being between about 2:1 and 4:1, the percentage conversion in said second polymerization zone not exceeding 80%, withdrawing polymerization product from said second polymerization zone while recycling a portion of said product to said second polymerization zone in the proportion of about 2:1 and 4:1, diluting said withdrawn polymerization product with methanol in the amount of 0.5 to 1.5 parts of methanol per part of withdrawn product, introducing the diluted product into an intermediate point of a fractional distillation zone while introducing vaporized methanol into a lower portion of said distillation zone and while introducing water into an upper portion of said distillation zone, the quantity of said methanol vapors being 0.75 to 1.5 parts by weight per part of combined diluted product and water, withdrawing a stream of methanol, water and polyvinyl acetate homopolymer from the bottom of said distillation zone and forming said last-named stream into a slurry, intimately mixing said slurry with an aqueous alkaline catalyst comprising sodium hydroxide and sodium carbonate and introducing the resultant catalyst-containing slurry into a saponification zone wherein said catalyst-containing slurry is caused to interreact and to provide an effluent containing polyvinyl alcohol and at least about 0.002 part of free alkaline catalyst per part of polyvinyl alcohol, diluting the effluent from said saponification zone in a diluting zone to form a flowable slurry, filtering the flowable slurry to provide a filtrate and a polyvinyl alcohol filter cake, recycling at least part of said filtrate to said diluting zone, whereby the filtrate is used to dilute said effluent, washing said filter cake with methanol and with a second portion of said filtrate to remove salts from said cake but to leave at least about 0.001 part of said alkaline catalyst therein per part of polyvinyl alcohol, and drying the thus-washed filter cake, whereby saponification continues to substantially 100% completion during said drying.

5. A process of making fiber-grade polyvinyl alcohol from polyvinyl acetate which comprises the steps of preparing a paste slurry consisting essentially of substantially linear polyvinyl acetate homopolymer, methanol and water, intimately mixing said slurry with an aqueous alkaline catalyst comprising sodium hydroxide and sodium carbonate and introducing the resultant mixture into a saponification zone wherein said resultant mixture is caused to interreact and to provide an effluent containing polyvinyl alcohol and at least about 0.6 mol percent free alkaline catalyst, diluting the effluent from said saponification zone in a diluting zone to form a flowable slurry, filtering the diluted slurry to provide a filtrate and a polyvinyl alcohol filter cake, recycling at least part of said filtrate to said diluting zone, whereby the filtrate is used to dilute said effluent, washing said filter cake with methanol and with a second portion of said filtrate to remove salts from said cake but to leave at least about 0.5 mol percent of said alkaline catalyst therein, and drying the thus-washed filter cake, whereby saponification continues to substantially 100% completion during said drying.

6. A process of producing by solution polymerization a substantially linear polyvinyl acetate homopolymer suitable for conversion by saponification into polyvinyl alcohol of a predetermined degree of polymerization which comprises the steps of continuously combining vinyl acetate with methanol and a polymerization catalyst selected from the group consisting of organic peroxides and azo compounds in a mixing zone while heating the resultant mixture to initiate polymerization, continuously introducing a stream of the heated mixture into a first polymerization zone wherein the contents of said polymerization zone are maintained at reflux temperature, maintaining the introduced vinyl acetate, methanol and catalyst in said first polymerization zone to effect partial homopolymerization and to provide a conversion to homopolymer of at least about 15% of the vinyl acetate in said introduced stream, continuously transferring a portion of the resultant partially-polymerized mass to a second polymerization zone wherein the contents of said polymerization zone are maintained at reflux temperature while recycling the remainder of said partially-polymerized mass to said first zone, the ratio of recycled partially-polymerized mass to the quantity of said partially-polymerized mass transferred to said second polymerization zone being at least about 2:1, maintaining said partially-polymerized mass in said second polymerization zone until at most 80% conversion has been effected, continuously removing the polymerized product from said second polymerization zone, recycling a portion of said product to said second polymerization zone in the proportion of at least about 2:1, diluting said polymerization product removed from said second polymerization zone with further quantities of methanol substantially immediately after removal from said second polymerization zone, removing unreacted vinyl acetate from the diluted polymerization product by introducing said diluted products into an intermediate point of a fractional distillation zone while introducing vaporized methanol into a lower portion of said distillation zone and while introducing water into an upper portion of said distillation zone, to provide a mixture of methanol and polyvinyl acetate homopolymer substantially free from vinyl acetate as a stream from the bottom of said distillation zone.

7. A process of making polyvinyl alcohol from polyvinyl acetate which comprises the steps of preparing a mixture consisting essentially of substantially linear polyvinyl acetate homopolymer, methanol and water, intimately mixing said mixture with an alkaline catalyst and introducing the resultant catalyst-containing mixture into a saponification zone wherein said resultant catalyst-contaniing mixture is caused to interreact and to provide an effluent containing polyvinyl alcohol and at least about 0.6 mol percent free alkaline catalyst, diluting the effluent from said saponification zone in a diluting zone with a methanolic solution to form a flowable slurry, filtering the diluted slurry to provide a filtrate and a polyvinyl alcohol filter cake, washing said filter cake with a methanolic solution to remove salts from said cake but to leave at least about 0.5 mol percent of said alkaline catalyst therein, and drying the thus-washed filter cake, whereby saponification continues to substantially 100% completion during said drying.

8. A process of making polyvinyl alcohol from polyvinyl acetate which comprises the steps of preparing a mixture consisting essentially of substantially linear polyvinyl acetate homopolymer, methanol and water, intimately mixing said mixture with an alkaline catalyst and introducing the resultant catalyst-containing mixture into a saponification zone wherein said resultant catalyst-containing mixture is caused to interreact and to provide an effluent containing polyvinyl alcohol and at least about 0.002 part of free alkaline catalyst per part of polyvinyl alcohol, diluting the effluent from said saponification zone in a diluting zone with a methanolic solution to form a flowable slurry, filtering the diluted slurry to provide a filtrate and a polyvinyl alcohol filter cake, washing said filter cake with a methanolic solution to remove salts from said cake but to leave at least about 0.001 part of said alkaline catalyst therein per part of polyvinyl alcohol, and drying the thus-washed filter cake, whereby saponification continues to substantially 100% completion during said drying.

9. A process of making polyvinyl alcohol as defined in claim 8, wherein said alkaline catalyst comprises sodium hydroxide and sodium carbonate.

References Cited by the Examiner

UNITED STATES PATENTS

| 2,183,642 | 12/1939 | Downes | 260—89.1 |
| 2,694,700 | 11/1954 | Shanta | 260—92.8 |
| 3,007,903 | 11/1961 | Stark | 260—87.7 |
| 3,036,054 | 5/1962 | Wheeler | 260—89.1 |

JOSEPH L. SCHOFER, *Primary Examiner.*

JAMES A. SEIDLECK, *Examiner.*

J. F. McNALLY, *Assistant Examiner.*